United States Patent
Spangler et al.

(10) Patent No.: US 10,669,861 B2
(45) Date of Patent: Jun. 2, 2020

(54) AIRFOIL COOLING STRUCTURE

(71) Applicant: United Technologies Corporation, Farmington, CT (US)

(72) Inventors: Brandon Spangler, Vernon, CT (US); Dominic Mongillo, West Hartford, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 447 days.

(21) Appl. No.: 15/433,130

(22) Filed: Feb. 15, 2017

(65) Prior Publication Data

US 2018/0230814 A1 Aug. 16, 2018

(51) Int. Cl.
*F01D 5/18* (2006.01)
*F01D 25/12* (2006.01)
*F01D 9/04* (2006.01)
*F01D 9/06* (2006.01)

(52) U.S. Cl.
CPC ............ *F01D 5/187* (2013.01); *F01D 5/186* (2013.01); *F01D 5/189* (2013.01); *F01D 9/041* (2013.01); F05D 2240/126 (2013.01); F05D 2240/127 (2013.01); F05D 2240/304 (2013.01); F05D 2260/22141 (2013.01); Y02T 50/673 (2013.01); Y02T 50/676 (2013.01)

(58) Field of Classification Search
CPC ........ F01D 5/1186; F01D 5/187; F01D 5/189; F01D 9/065; F01D 9/041; F05D 2220/32; F05D 2240/127; F05D 2240/30; F05D 2240/304; F05D 2260/22141; F05D 2260/232; Y02T 50/673; Y02T 50/676
See application file for complete search history.

(56) References Cited

U.S. PATENT DOCUMENTS

| 3,902,820 | A | * | 9/1975 | Amos | F01D 5/189 |
| | | | | | 416/191 |
| 3,930,748 | A | * | 1/1976 | Redman | F01D 5/189 |
| | | | | | 416/97 R |
| 4,153,386 | A | * | 5/1979 | Leogrande | F01D 5/188 |
| | | | | | 415/115 |

(Continued)

FOREIGN PATENT DOCUMENTS

GB 2054749 2/1981

OTHER PUBLICATIONS

European Patent Office, European Search Report dated Nov. 30, 2018 in Application No. 17204171.7.

*Primary Examiner* — Igor Kershteyn
(74) *Attorney, Agent, or Firm* — Snell & Wilmer, L.L.P.

(57) ABSTRACT

An airfoil may comprise an airfoil body having a leading edge, a trailing edge, an inner diameter end wall and an outer diameter end wall. A first cooling structure may be disposed within the airfoil body. The first cooling structure may comprise a first rib extending between the inner diameter end wall and the outer diameter end wall and may define a first radial passage configured to conduct a cooling airflow in a radial direction through the airfoil body. A second cooling structure may be disposed within the airfoil body. The second cooling structure may comprise a first baffle defining an axial passage configured to conduct the cooling airflow in an axial direction toward the trailing edge of the airfoil body.

19 Claims, 11 Drawing Sheets

(56) References Cited

U.S. PATENT DOCUMENTS

| | | | | |
|---|---|---|---|---|
| 4,252,501 A | * | 2/1981 | Peill | F01D 5/189 |
| | | | | 415/115 |
| 4,297,077 A | * | 10/1981 | Durgin | F01D 5/189 |
| | | | | 416/97 R |
| 4,616,976 A | * | 10/1986 | Lings | F01D 5/186 |
| | | | | 415/114 |
| 5,120,192 A | * | 6/1992 | Ohtomo | F01D 5/189 |
| | | | | 415/115 |
| 5,259,730 A | * | 11/1993 | Damlis | B23P 15/04 |
| | | | | 416/96 A |
| 5,340,274 A | * | 8/1994 | Cunha | F01D 5/182 |
| | | | | 415/114 |
| 5,516,260 A | * | 5/1996 | Damlis | F01D 5/189 |
| | | | | 415/115 |
| 5,690,472 A | | 11/1997 | Lee | |
| 5,762,471 A | * | 6/1998 | Cunha | F01D 5/189 |
| | | | | 415/115 |
| 6,036,436 A | * | 3/2000 | Fukuno | F01D 5/187 |
| | | | | 415/115 |
| 6,099,244 A | * | 8/2000 | Tomita | F01D 5/18 |
| | | | | 415/115 |
| 6,200,087 B1 | * | 3/2001 | Tung | F01D 5/186 |
| | | | | 415/115 |
| 6,428,273 B1 | * | 8/2002 | Keith | F01D 5/189 |
| | | | | 416/97 R |
| 6,874,988 B2 | * | 4/2005 | Tiemann | F01D 5/189 |
| | | | | 415/115 |
| 6,884,036 B2 | * | 4/2005 | Shi | F01D 5/187 |
| | | | | 415/115 |
| 6,969,233 B2 | * | 11/2005 | Powis | F01D 5/189 |
| | | | | 415/191 |
| 7,921,654 B1 | * | 4/2011 | Liang | F01D 5/186 |
| | | | | 415/115 |
| 8,142,153 B1 | * | 3/2012 | Liang | F01D 9/04 |
| | | | | 416/1 |
| 2002/0090294 A1 | * | 7/2002 | Keith | F01D 5/189 |
| | | | | 415/115 |
| 2003/0068222 A1 | * | 4/2003 | Cunha | F01D 5/18 |
| | | | | 415/115 |
| 2014/0075947 A1 | | 3/2014 | Gautschi et al. | |

* cited by examiner

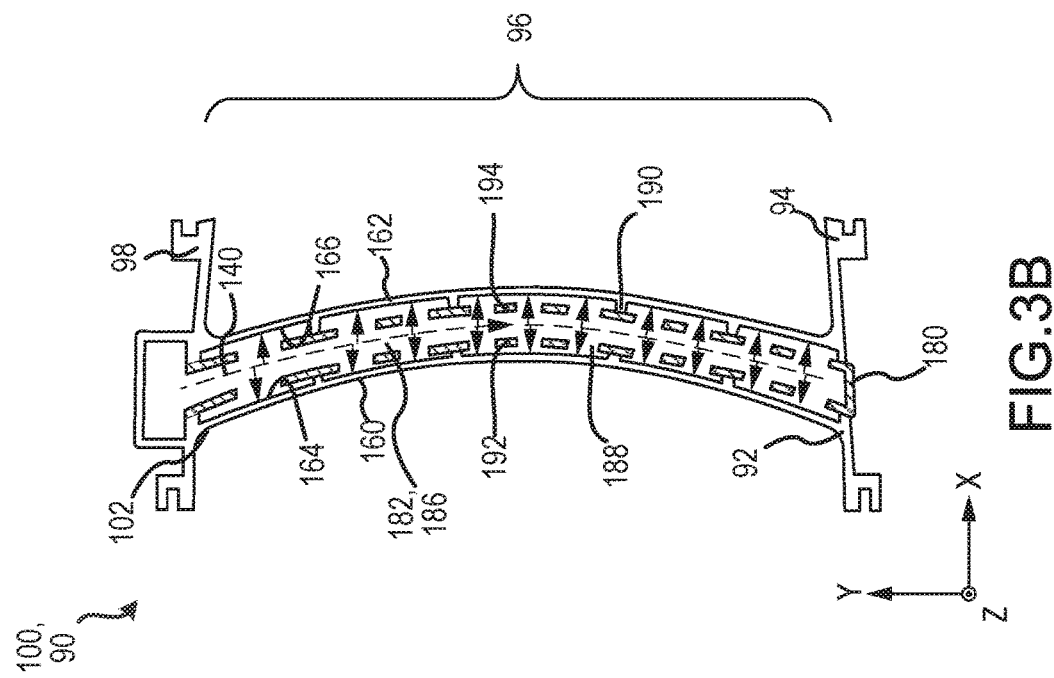
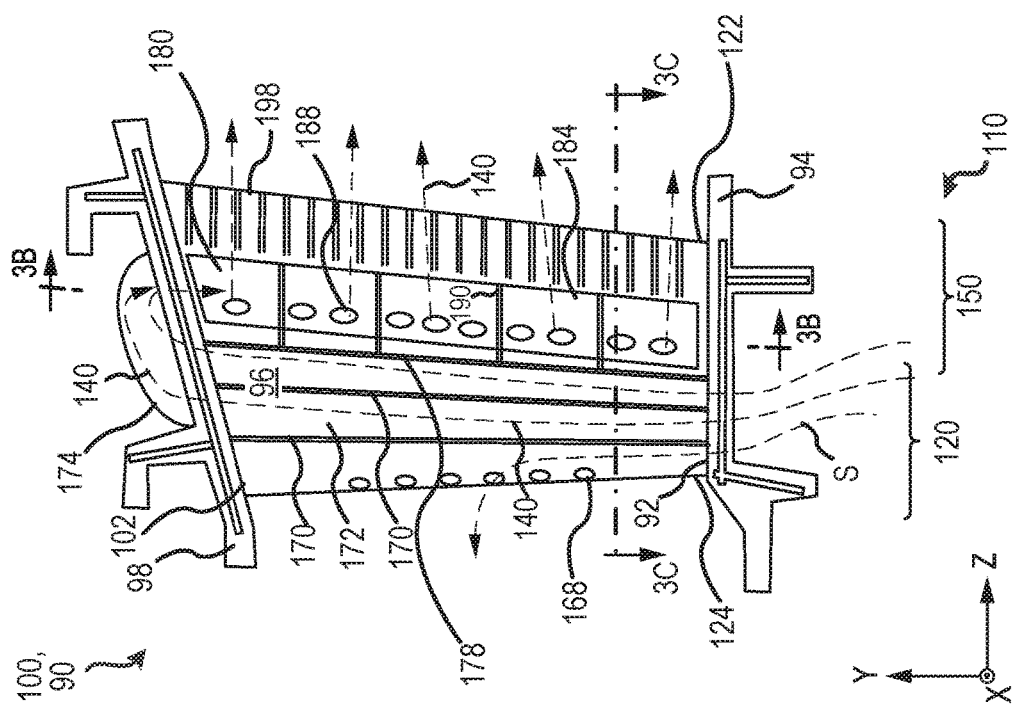

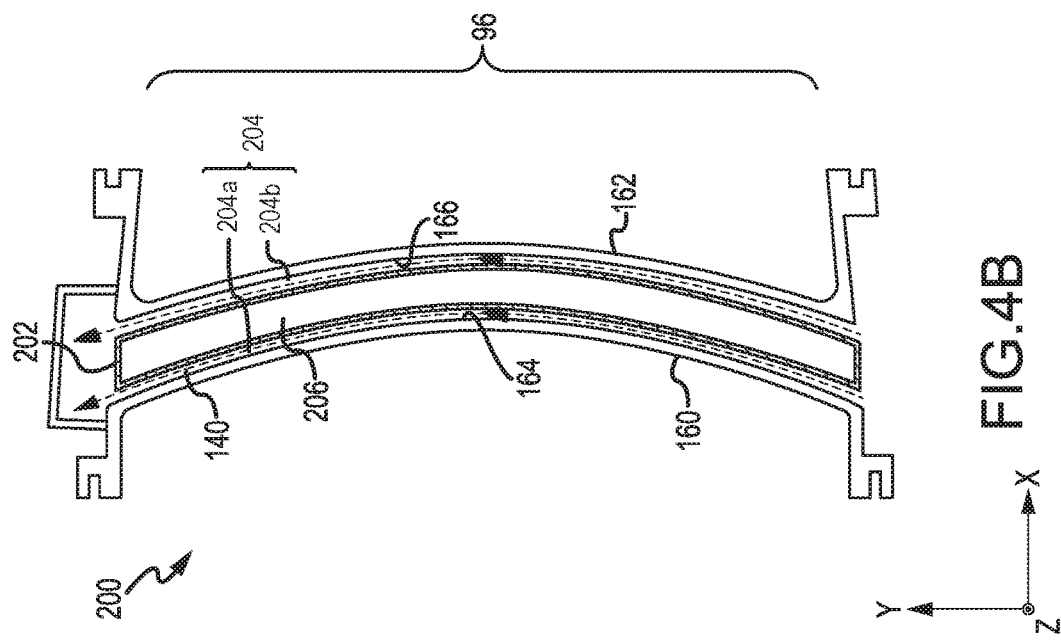
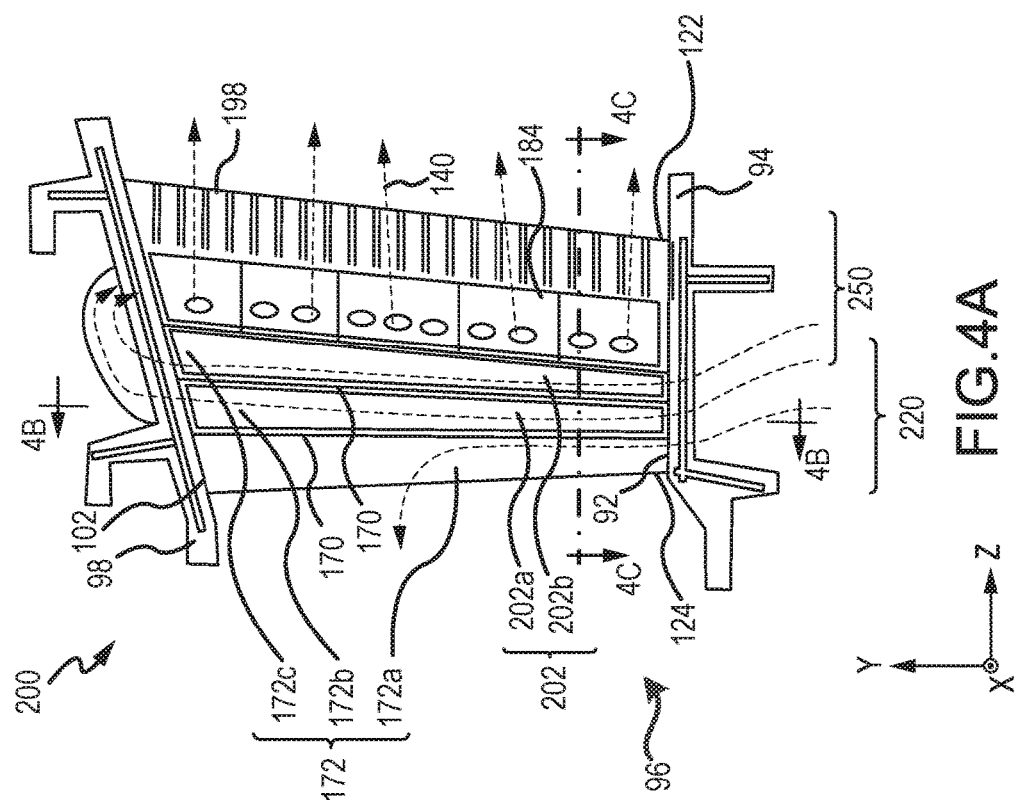

AIRFOIL COOLING STRUCTURE

GOVERNMENT LICENSE RIGHTS

This disclosure was made with government support under Contract No. FA8650-09-D-2923-0021 awarded by the United States Air Force. The government has certain rights in the disclosure.

FIELD

The present disclosure relates to cooling structures for gas turbine engines, and, more specifically, to airfoil cooling structures.

BACKGROUND

A gas turbine engine typically includes a fan section, a compressor section, a combustor section, and a turbine section. A fan section may drive air along a bypass flowpath while a compressor section may drive air along a core flowpath. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads. The compressor section typically includes low pressure and high pressure compressors, and the turbine section includes low pressure and high pressure turbines. The turbine section includes multiple stages of blades and vanes. As fluid flows through the turbine section, the flow causes the blades to rotate about an axis of rotation. The vanes, positioned between each row of blades, are used to redirect the flow in order to maximize the power received by the downstream blades.

Temperatures within the turbine section may be relatively high, as the flow of fluid is received initially from the combustor section of the gas turbine engine. Cooling air may be extracted from the compressor section and used to cool the gas path components. Cooled components may include, for example, rotating blades and stator vanes in the turbine section.

SUMMARY

An airfoil for use in a gas turbine engine is provided. The airfoil may comprise an airfoil body having a leading edge, a trailing edge, an inner diameter end wall and an outer diameter end wall. A first cooling structure may be disposed within the airfoil body. The first cooling structure may comprise a first rib extending between the inner diameter end wall and the outer diameter end wall and may define a first radial passage configured to conduct a cooling airflow in a radial direction through the airfoil body. A second cooling structure may be disposed within the airfoil body. The second cooling structure may comprise a first baffle defining an axial passage configured to conduct the cooling airflow in an axial direction toward the trailing edge of the airfoil body.

In various embodiments, the first radial passage may further comprise a turn configured to direct the cooling airflow from the first cooling structure into the second cooling structure. The first cooling structure may further comprise a plurality of ribs defining a plurality of radial passages. The first cooling structure may further comprise a second baffle disposed in the first radial passage. The second baffle may occupy a portion of the first radial passage to reduce a cross sectional channel area of the cooling airflow through the first radial passage. A plurality of apertures may be formed in the trailing edge of the airfoil body. The plurality of apertures may be configured to conduct the cooling airflow exiting of the airfoil body. The first baffle may define a second radial passage within the first baffle. The first baffle may define a plurality of first openings to direct the cooling airflow from within the first baffle and toward at least one of a suction side wall or a pressure side wall of the airfoil body. The first baffle may further define a plurality of second openings in a trailing edge of the first baffle to direct the cooling airflow from within the first baffle toward the trailing edge of the airfoil body. The second baffle may define a second radial passage. The second baffle may be configured to thermally isolate the second radial passage from the first radial passage.

A turbine section of a gas turbine engine is also provided. The turbine section may comprise a blade coupled to a disk configured to rotate about an axis. A vane may have an airfoil body. The airfoil body may have a leading edge, a trailing edge, an inner diameter end wall and an outer diameter end wall. A first cooling structure may be disposed within the airfoil body. The first cooling structure may comprise a first rib extending between the inner diameter end wall and the outer diameter end wall and may define a first radial passage configured to conduct a cooling airflow in a radial direction through the airfoil body. A second cooling structure may be disposed within the airfoil body. The second cooling structure may comprise a first baffle defining an axial passage configured to conduct the cooling airflow in an axial direction toward the trailing edge of the airfoil body.

In various embodiments, the first radial passage may further comprise a turn configured to direct the cooling airflow from the first cooling structure into the second cooling structure. The first cooling structure may further comprise a second baffle disposed in the first radial passage. The second baffle may occupy a portion of first radial passage to reduce a cross sectional channel area of the cooling airflow through the first radial passage. The second cooling structure may be disposed aft of first cooling structure within the airfoil body. A plurality of apertures may be formed in the trailing edge of the airfoil body. The plurality of apertures may be configured to conduct the cooling airflow exiting the airfoil body. The first baffle may define a second radial passage within the first baffle. The first baffle may define a plurality of first openings to direct the cooling airflow from within the first baffle and toward at least one of a suction side wall or a pressure side wall of the airfoil body. The first baffle may further define a plurality of second openings in a trailing edge of the first baffle to direct the cooling airflow from within the first baffle toward the trailing edge of the airfoil body. The second baffle may define a second radial passage. The second baffle may be configured to thermally isolate the second radial passage from the first radial passage.

A gas turbine engine is also provided. The gas turbine engine may comprise a turbine section having a core flowpath and a cooling airflow. An airfoil may have an airfoil body disposed in the core flowpath. A first cooling structure may be disposed within the airfoil body. The first cooling structure may comprise a rib defining a first radial passage configured to direct the cooling airflow through a forward portion of the airfoil body. A second cooling structure may be disposed within the airfoil body. The second cooling structure may comprise a first baffle defining an axial passage configured to direct the cooling airflow through an aft portion of the airfoil body.

In various embodiments, the first cooling structure may further comprise a second baffle disposed in the first radial passage. The second baffle may occupy a portion of first radial passage to reduce a cross sectional channel area of the cooling airflow through the first radial passage. The first radial passage may further comprise a turn configured to direct the cooling airflow from the first cooling structure into the second cooling structure. The first baffle may define a second radial passage within the first baffle. The first baffle may define a plurality of openings to direct the cooling airflow from within the first baffle and toward at least one of a suction side wall or a pressure side wall of the airfoil body. A plurality of apertures may be formed in a trailing edge of the airfoil body. The plurality of apertures may be configured to conduct the cooling airflow from the axial passage toward the trailing edge of the airfoil body.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

FIGS. 3A, 3B and 3C illustrate views of a vane airfoil including an internal cooling system, in accordance with various embodiments;

FIGS. 4A, 4B and 4C illustrate views of an airfoil including an internal cooling system, in accordance with various embodiments;

DETAILED DESCRIPTION

Figure 1:
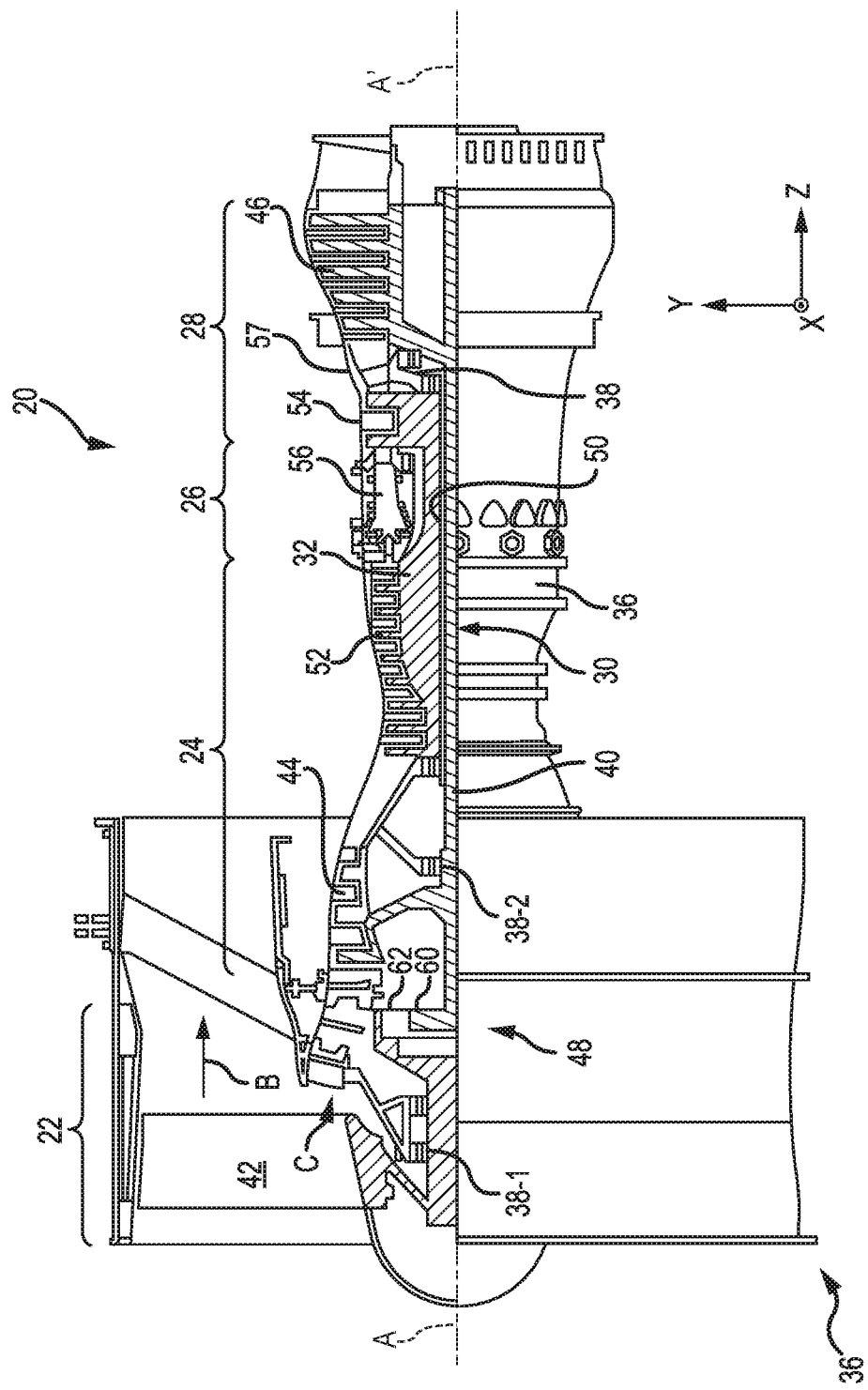
FIG. 1 illustrates a cross-sectional view of an exemplary gas turbine engine, in accordance with various embodiments.

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Any reference related to fluidic coupling to serve as a conduit for cooling airflow and the like may include permanent, removable, temporary, partial, full, and/or any other possible attachment option. Additionally, any reference to without contact (or similar phrases) may also include reduced contact or minimal contact. Cross hatching lines may be used throughout the figures to denote different parts but not necessarily to denote the same or different materials.

It should be understood that various embodiments may be realized and that logical alterations and modifications to various geometric features described herein may be altered to provide more optimal passage geometries, airflow distributions, and internal convective cooling characteristics in order to optimize both local and overall thermal cooling effectiveness in order to achieve specific durability life and aerodynamic performance outputs. In various embodiments, additional casting methods may use fugitive core technologies. Additive manufacturing methods may also be used to create and fabricate integral geometric features and/or may provide the ability to tailor specific geometric surfaces and features that are unique to particular aerodynamic airfoil and cooling configurations in order to simplify and/or mitigate manufacturing and assembly costs associated with alternate design schemes incorporating similar principles to those described within the context of this invention.

As used herein, "aft" refers to the direction associated with the exhaust (e.g., the back end) of a gas turbine engine. As used herein, "forward" refers to the direction associated with the intake (e.g., the front end) of a gas turbine engine.

A first component that is "radially outward" of a second component means that the first component is positioned at a greater distance away from the engine central longitudinal axis than the second component. A first component that is "radially inward" of a second component means that the first component is positioned closer to the engine central longitudinal axis than the second component. In the case of components that rotate circumferentially about the engine central longitudinal axis, a first component that is radially inward of a second component rotates through a circumferentially shorter path than the second component. The terminology "radially outward" and "radially inward" may also be used relative to references other than the engine central longitudinal axis. A first component that is "radially outward" of a second component means that the first component is positioned at a greater distance away from the engine central longitudinal axis than the second component. As used herein, "distal" refers to the direction outward, or generally, away from a reference component. As used herein, "proximal" refers to a direction inward, or generally, towards the reference component.

The next generation turbofan engines are designed for higher efficiency and use higher pressure ratios and higher temperatures in the high pressure compressor than are conventionally experienced. These higher operating temperatures and pressure ratios create operating environments that cause thermal loads that are higher than the thermal loads conventionally experienced, which may shorten the operational life of current components.

An airfoil may include internal cooling features. The cooling features may direct a cooling airflow through the airfoil. The cooling features may be configured to control the heat pick up of the cooling airflow temperature and subsequent pressure loss of the cooling airflow by tailoring the available channel area of the cooling cavities, as well as, controlling the distribution and placement of internal convective heat transfer features, such as trip strips (turbulators), pin fins, pedestals and the like. By optimizing the local thermal cooling effectiveness the thermal gradients can be tailored to more evenly cool the hot airfoil external airfoil walls in order to optimize the durability capability and aerodynamic performance of the airfoil component. The cooling features may include radial cooling passages and axial pressure side and/or suction side cooling passages to distribute the cooling airflow along the inner surfaces of the airfoil. A plurality of ribs may separate radial flow passages at a forward area of the airfoil and may direct the cooling airflow through parallel and/or serpentine flow passages, to increase heat transfer between the airfoil walls and the cooling air. The ribs provide support to the walls of the airfoil, and thus, the airfoil walls may be made thinner. The cooling features may further include axial divider ribs which radially segregate the pressure side and/or suction side axial flow passages in order to more optimally distribute and direct the cooling airflow out of the airfoil to trailing edge apertures. The configuration of radial and axial flow passages may depend on the design and function of the airfoil. The density and/or location of internal convective heat transfer augmentation features (i.e. trip strips, pin fins, dimples, etc.) may be tailored independently to optimize local internal cooling channel pressure losses, cooling airflow temperature heat pickup, and convective heat transfer depending on local and bulk internal convective cooling design.

With reference to FIG. 1, a gas turbine engine 20 is shown according to various embodiments. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive coolant (e.g., air) along a path of bypass airflow B while compressor section 24 can drive coolant along a core flowpath C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 or engine case via several bearing systems 38, 38-1, and 38-2. Engine central longitudinal axis A-A' is oriented in the z direction on the provided x-y-z axes. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44 and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54. A combustor 56 may be located between high pressure compressor 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The airflow of core flowpath C may be compressed by low pressure compressor 44 then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion.

Gas turbine engine 20 may be, for example, a high-bypass ratio geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared aircraft engine, such as a geared turbofan, or non-geared aircraft engine, such as a turbofan, or may comprise any gas turbine engine as desired.

Figure 2:
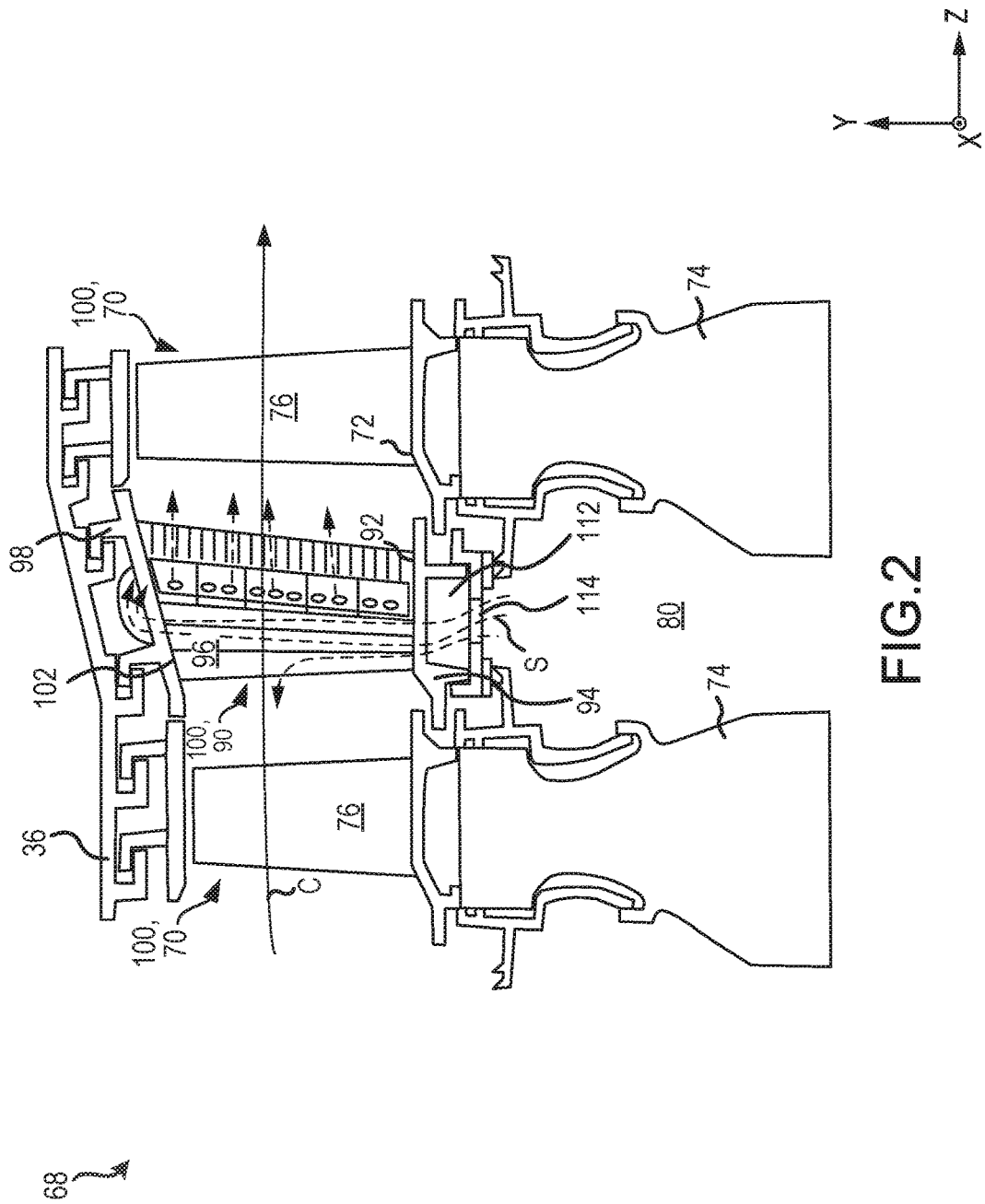
FIG. 2 illustrates an engine section including example airfoils, such as a blade and a vane of an exemplary gas turbine engine, according to various embodiments.

Referring now to FIG. 1 and to FIG. 2, according to various embodiments, each of low pressure compressor 44, high pressure compressor 52, low pressure turbine 46, and high pressure turbine 54 in gas turbine engine 20 may comprise one or more stages or sets of rotating blades and one or more stages or sets of stationary vanes axially interspersed with the associated blade stages but non-rotating about engine central longitudinal axis A-A'. Each compressor stage and turbine stage may comprise multiple interspersed stages of blades 70 and vanes 90. The blades 70 rotate about engine central longitudinal axis A-A', while the vanes 90 remain stationary with respect to engine central longitudinal axis A-A'. Blades 70 and vanes 90 may be referred to as airfoils 100. For example, FIG. 2 schematically shows, by example, a portion of an engine section 68, which is illustrated as a turbine section 28 of gas turbine engine 20.

With reference to FIG. 2, a schematic view of a portion of engine section 68 is shown, in accordance with various embodiments. Engine section 68 may include a circumferential array of blades 70 coupled about a circumference of a generally circular disk 74. Disk 74 may be disposed radially inward of core flowpath C and centered on the rotation axis of the gas turbine engine. Disk 74 with blades 70 may be configured to rotate about engine central longitudinal axis A-A'. Each blade 70 may include an airfoil body 76 with a platform disposed at an inner diameter end wall 72 of the blade 70. A disk cavity 80 may be defined between a forward disk and an aft disk. Upstream (forward) and downstream (aft) of blades 70 are circumferential arrays of vanes 90 configured to guide core flowpath C through the engine section 68.

Each vane 90 may include an airfoil body 96 with an inner diameter platform 94 disposed at an inner diameter end wall 92 of vane 90 and with an outer diameter platform 98 disposed at an outer diameter end wall 102 of vane 90. Outer diameter platform 98 may be coupled to engine case structure 36. Inner diameter platform 94 and/or outer diameter platform 98 may be coupled to or integral with vane 90.

In various embodiments and with reference to FIG. 3A and still to FIG. 2, vane 90 may comprise an internal cooling system 110 having a first cooling structure 120 and a second cooling structure 150. Internal cooling system 110 is configured to convectively remove heat from the airfoil body 96 of vane 90. A secondary airflow path S may be defined within disk cavity 80 and may contain a cooling fluid. The cooling fluid, such as bleed air, may be introduced into a cavity 112 of inner diameter platform 94 through an orifice 114 in inner diameter platform 94. In various embodiments, the coolant may flow into a vane via a vane outer diameter cavity. First cooling structure 120 and second cooling structure 150 may be configured to direct the cooling fluid as a cooling airflow 140 through airfoil body 96. Blade 70 may similarly include an internal cooling system, such as internal cooling system 110.

With reference to FIGS. 3A and 3B, a schematic view an airfoil 100 having a first cooling structure 120 and a second cooling structure 150 is shown, according to various embodiments. The airfoil 100 having first cooling structure 120 and second cooling structure 150 may be a blade or a vane. Airfoil 100 is depicted in FIG. 3A as a vane 90, however, the features may be applicable to blades 70 (see FIG. 8). Airfoil 100 may be a vane 90 comprising a trailing edge 122 facing an aft direction in the gas turbine engine and leading edge 124 facing a forward direction in the gas turbine engine. Leading edge 124 and trailing edge 122 may be configured and oriented to direct airflow through engine section 68 (FIG. 2). Airfoil body 96 of vane 90 may extend from an inner diameter end wall 92 to outer diameter end wall 102 of vane 90.

Referring still to FIGS. 3A and 3B, FIG. 3B illustrates a cross-sectional view of an airfoil 100 taken along line 3B-3B of FIG. 3A, in accordance with various embodiments. Airfoil body 96 may include a pressure side wall 160 (i.e. having a generally concave surface) and a suction side wall 162 (i.e. having a generally convex surface) joined together at the respective trailing edge 122 and leading edge 124 (FIG. 3B). An airfoil body 96 may be configured to accommodate first cooling structure 120 and second cooling structure 150.

In various embodiments, an internal cooling system 110 of vane 90 may comprise a first cooling structure 120 configured to remove heat from airfoil body 96. First cooling structure 120 may comprise one or more ribs 170, which may define one or more radial passages 172 within airfoil body 96. Radial passages 172 extend in generally the radial direction, i.e., the y-direction on the provided x-y-z axes. Ribs 170 may extend in the x-y-plane from a pressure side 160 to suction side wall 162, and from the inner diameter end wall 92 to the outer diameter end wall 102. Stated differently, ribs 170 may extend between a pressure side 160 and suction side wall 162, and may extend between the inner diameter end wall 92 and the outer diameter end wall 102. In various embodiments, vane 90 may include any number of radial passages 172 and any number of ribs 170. The radial passages 172 are each separated by ribs 170. Radial passages 172 may be configured to conduct cooling airflow 140 in a radial direction (y-direction) through airfoil body 96. Radial passages 172 operate as a conduit for cooling airflow 140 and provide control over the flow and temperature of cooling airflow 140. By controlling the temperature of cooling airflow 140 via controlling the cross-sectional area of the passage, the airfoil 100 is configured to be more uniformly cooled from inner diameter end wall 92 to outer diameter end wall 102 and from leading edge 124 to trailing edge 122.

In various embodiments, first cooling structure 120 may receive cooling airflow 140 from a secondary airflow path S at inner diameter end wall 92 of airfoil body 96. In various embodiments, first cooling structure 120 may receive the cooling airflow from the outer diameter of the vane. Cooling airflow 140 may be conducted from the inner diameter end wall 92 radially outward through radial passages 172. Radial passages 172 may comprise parallel channels and may have a serpentine geometry. In that regard, the radial passages 172 may include one or more turn 174, which may redirect the cooling airflow 140 from flowing in a first radial direction, such as the positive y-direction, to flowing in a second radial direction, such as the negative y-direction. In that regard, turn 174 may comprise a 180-degree turn. A portion of cooling airflow 140 may be discharged through a plurality of apertures 168 at leading edge 124. Apertures 168 may be cylindrical, circular, oval, teardrop, rectangular, slots, ellipses, irregular, or other shape. Apertures 168 may be radially and/or axially oriented. Another portion of cooling airflow 140 may be directed through radial passages 172 of first cooling structure 120 and to a second cooling structure 150.

Figure 3C:
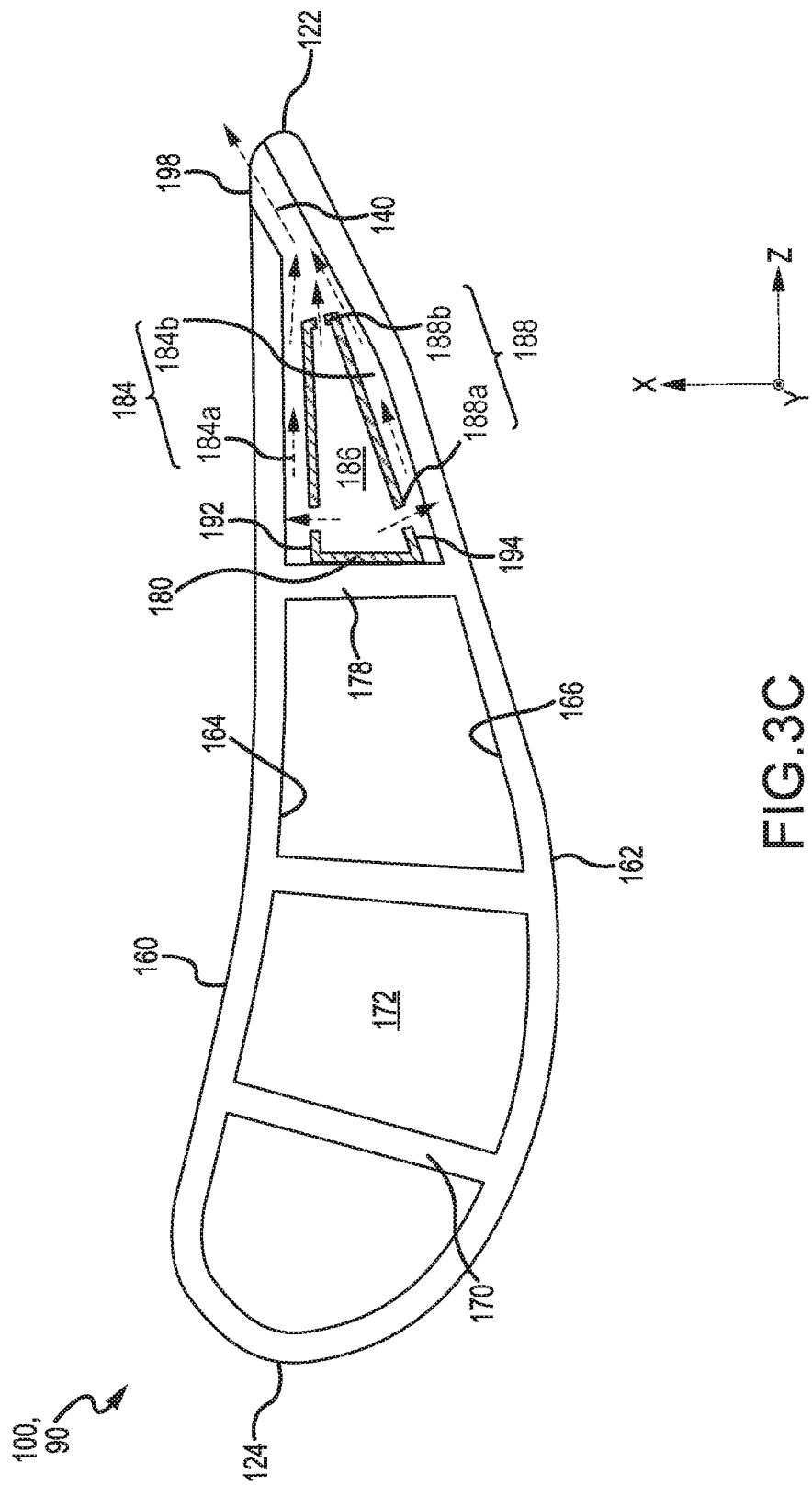

Referring still to FIGS. 3A and 3B and now to FIG. 3C, FIG. 3C illustrates a cross-sectional view of an airfoil 100 taken along line 3C-3C of FIG. 3A, in accordance with various embodiments. Ribs 170 may contact an inner surface 164 of pressure side wall 160 and an inner surface 166 of suction side wall 162. Ribs 170 may couple pressure side wall 160 and suction side wall 162 and may provide structural support to the pressure side wall 160 and suction side wall 162 to reduce bulging and/or deformation of the walls 160, 162 due gas path pressure loadings, metal temperatures, and thermal gradients. A distance between ribs 170 may be decreased, and a quantity of ribs 170 increased (i.e., increasing the density of ribs 170) to provide additional support for walls 160, 162. With the additional support by ribs 170, the airfoil walls, i.e., pressure side wall 160 and suction side wall 162, may be made thinner. The thinner airfoil walls may be more efficiently cooled by cooling airflow 140 than thicker airfoil walls.

In various embodiments and referring still to FIGS. 3A, 3B and 3C, vane 90 may further comprise a second cooling structure 150 configured to remove heat from airfoil body 96. Second cooling structure 150 may comprise one or more baffles 180 which may define one or more radial passages 182 through airfoil body 96. Second cooling structure 150 may further comprise one or more axial passages 184 within airfoil body 96. In various embodiments, second cooling structure 150 may be disposed aft of first cooling structure 120 within the airfoil body 96, and the axial passages 184 may be configured to direct the cooling airflow 140 through an aft portion of the airfoil body 96. Axial passages 184 may include pressure side axial passages 184a and suction side axial passages 184b (see FIG. 3C). A baffle 180 may extend in the y-z-plane from an aft rib 178 toward trailing edge 122, and from the inner diameter end wall 92 to the outer diameter end wall 102 of airfoil body 96. Baffle 180 may be offset from pressure side wall 160 and suction side wall 162. Baffle 180 may define an inner passage 186, which may be a radial passage 182, within baffle 180, and may further define a plurality of openings 188. Openings 188 formed in baffle 180 may include a plurality of first openings 188a formed at a pressure side and/or suction side wall. Openings 188 formed in baffle 180 may include a plurality of second openings 188b formed in a trailing edge 189 of baffle 180.

Upon receiving cooling airflow 140 from first cooling structure 120, cooling airflow 140 may be directed through inner passage 186 within baffle 180 in a radial direction, shown in FIGS. 3A and 3B in a radially inward direction (negative y-direction). Cooling airflow 140 may exit the inner passage 186 of baffle 180 through one or more openings 188. Openings 188 may be cylindrical, circular, oval, teardrop, rectangular, slots, ellipses, irregular, or other shape. Openings 188 may be radially and/or axially oriented. The shape and orientation of openings 188 may be configured to optimize the fill characteristics of cooling airflow 140 as the cooling airflow 140 is expelled from baffle 180 and travels in predominately the axial direction (z-direction) adjacent to an inner surface 164 of pressure side wall 160 and to an inner surface 166 of suction side wall 162 toward trailing edge 122 of airfoil 100. Cooling airflow 140 may impinge the inner surfaces 164, 166 of airfoil body 96 and travel axially aft through axial passages 184 toward trailing edge 122. First openings 188a may direct cooling airflow 140 from within baffle 180 toward at least one of the suction side wall 162 or the pressure side wall 160 of the airfoil body 96. Second openings 188b may direct cooling airflow 140 from within baffle 180 toward trailing edge 122 of airfoil body 96.

In various embodiments, axial standoffs 190 may extend inward from inner surfaces 164, 166 of airfoil body 96 toward baffle 180 to direct cooling airflow 140 axially through axial passages 184. Axial standoffs 190 may contact a first wall 192 and a second wall 194 of baffle 180 to define axial passages 184 between first wall 192 of baffle 180 and pressure side wall 160 of airfoil body 96 and between second wall 194 of baffle 180 and suction side wall 162. A plurality of apertures 198 may be formed in the trailing edge 122 of the airfoil body 96. The plurality of apertures 198 may operate as a conduit for cooling airflow 140 and may be configured to conduct the cooling airflow 140 exiting the airfoil body 96. Cooling airflow 140 may exit airfoil body 96 though the plurality of apertures 198. The cooling airflow 140 in axial passages 184, as well as first wall 192 and second wall 194 of baffle 180, shield the cooling airflow 140 within inner passage 186 from heat generated by walls 160, 162, preventing heatup of the cooling airflow 140 as it travels radially through inner passage 186, allowing airfoil 100 to be more uniformly cooled.

Figure 4C:
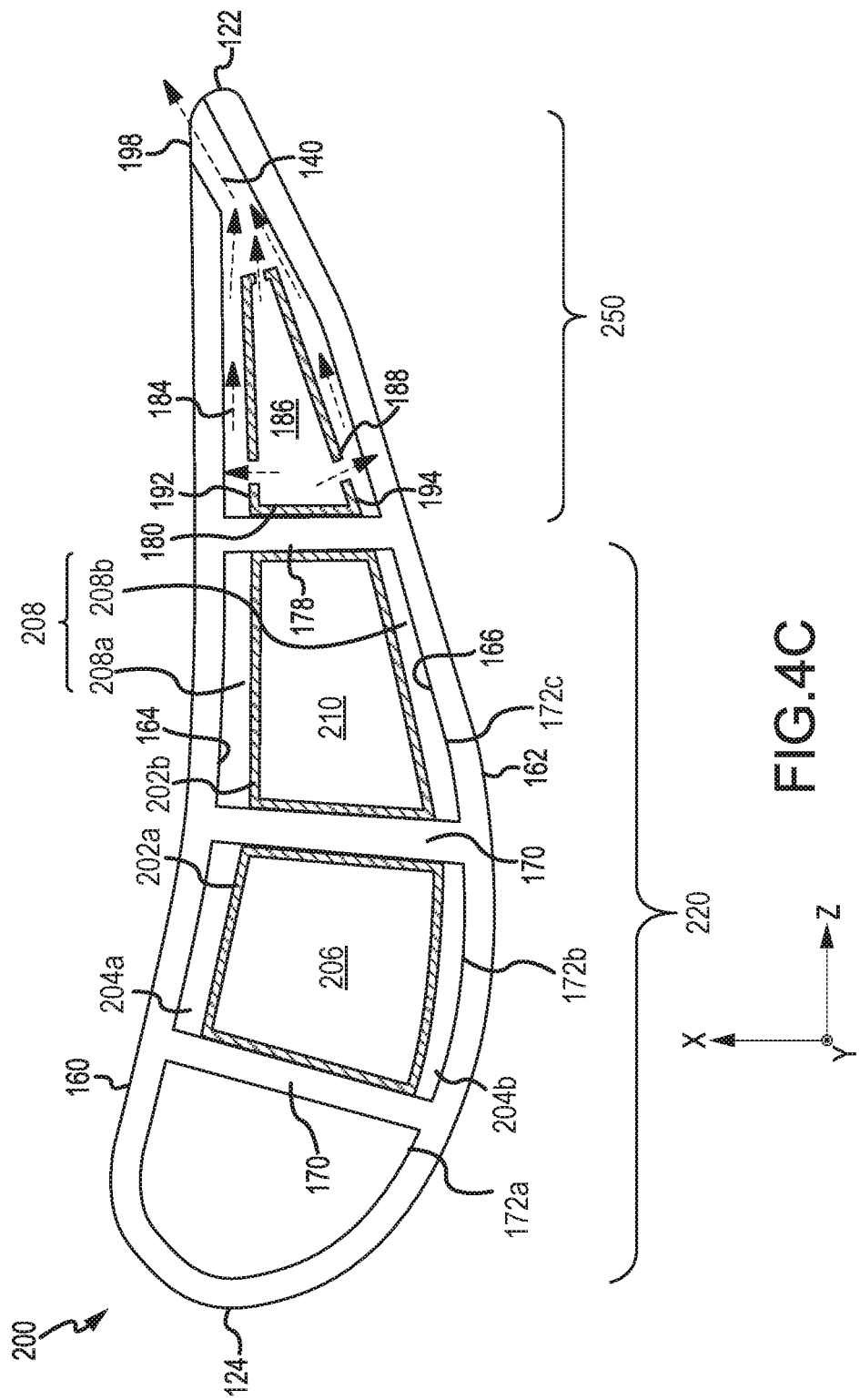

With reference to FIGS. 4A, 4B and 4C, a schematic view of an airfoil 200 is shown, in accordance with various embodiments. In various embodiments, airfoil 200 may have the features of airfoil 100 from FIG. 3A, and may further comprise one or more space-eater baffles 202 further defining one or more radial passages 204, 208 within radial passages 172. A "space-eater baffle" may, for example, refer to a structure having one or more walls configured to occupy or block a portion of space with a passage in order to reduce a cross-sectional area of the passage. FIG. 4A shows an airfoil 200 including a first cooling structure 220 and a second cooling structure 250, similar to cooling structures 120, 150 (from FIG. 3A).

In various embodiments, first cooling structure 220 may include radial passages 172a, 172b, and 172c defined by ribs 170. A first space-eater baffle 202a may be disposed between ribs 170 within radial passage 172b. First space-eater baffle 202a may occupy a portion of the radial passage 172b to reduce a cross sectional channel area of the cooling airflow 140 through radial passage 172b of first cooling structure 220. First space-eater baffle 202a may define a plurality of radial passages 204 within radial passage 172b, and more specifically, may define a pressure side radial passage 204a between first space-eater baffle 202a and inner surface 164 of pressure side wall 160 and may define a suction side radial passage 204b between first space-eater baffle 202a and inner surface 166 of suction side wall 162. Cooling airflow 140 may flow through radial passages 204a, 204b, which have a reduced cross sectional channel area relative to a radial passage 172b without a first space-eater baffle 202a. Similarly, a second space-eater baffle 202b may be disposed within radial passage 172c and may occupy a portion of the radial passage 172c to reduce a cross sectional channel area of the cooling airflow 140 through radial passage 172c of first cooling structure 220 (see FIG. 4C). Second space-eater baffle 202b may define a plurality of radial passages 208 within radial passage 172c, and more specifically, may define a pressure side radial passage 208a between second space-eater baffle 202b and inner surface 164 of pressure side wall 160 and may define a suction side radial passage 208b between second space-eater baffle 202b and inner surface 166 of suction side wall 162. Thus, the flowpath of radial passages 172b, 172c may be narrowed by the presence of space-eater baffles 202a, 202b.

The cross sectional channel area of cooling airflow 140 may be reduced by space-eater baffles 202, which in turn increase the internal convective heat transfer between cooling airflow 140 and walls 160, 162. As a result, less cooling airflow 140 may be used to achieve the desired internal convective heat transfer and thermal cooling effectiveness of airfoil 100. In various embodiments, first space-eater baffle 202a may be sealed at an inner diameter end wall 92 and an outer diameter end wall 102 to define a chamber 206 within first space-eater baffle 202a. Cooling airflow 140 may not flow through chamber 206. Chamber 206 may operate as a heat shield between pressure side radial passage 204a adjacent to pressure side wall 160 and suction side radial passage 204b adjacent to suction side wall 162. For example, first space-eater baffle 202a having chamber 206 may be configured to thermally isolate pressure side radial passage 204a and suction side radial passage 204b defined by first space-eater baffle 202a. First space-eater baffle 202a having chamber 206 may reduce heat transfer between the radial passages 204, thereby allowing more control over the flow and temperature of cooling airflow 140. In various embodiments, second space-eater baffle 202b may be sealed at an inner diameter end wall 92 and an outer diameter end wall 102 to define a chamber 210 within space-eater baffle 202b, through which cooling airflow 140 may not flow. Second space-eater baffle 202b having chamber 210 may be configured to thermally isolate pressure side radial passage 208a and suction side radial passage 208b, thereby reducing heat transfer between the radial passages 208 and allowing more control over the flow and temperature of cooling airflow 140. By controlling the temperature of cooling airflow 140 via controlling the flow, the airfoil 200 is configured to be more uniformly cooled from inner diameter end wall 92 to outer diameter end wall 102 and from leading edge 124 to trailing edge 122. Radial passages 204, 208 may have different sizes and shapes and can be tailored in the radial, axial and circumferential directions depending on design optimization of local heat transfer, pressure loss, and heat pickup preferences to achieve local and bulk thermal cooling effectiveness in order to meet durability life and aerodynamic performance goals.

Figure 5:
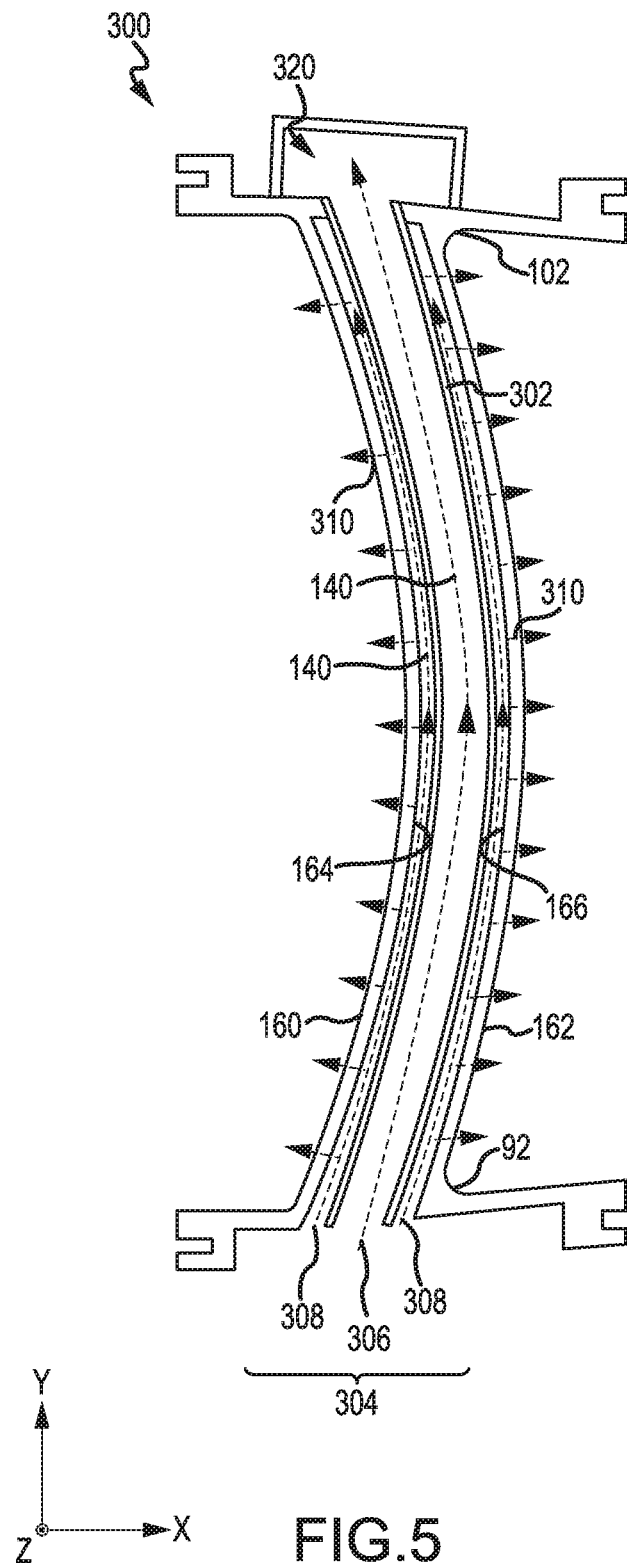
FIG. 5 illustrates a schematic view of an airfoil including an internal cooling system, in accordance with various embodiments.

With reference to FIG. 5, a schematic view of an airfoil 300 is shown, in accordance with various embodiments. In various embodiments, airfoil 300 may have features similar to airfoil 200 from FIG. 4A, and may comprise a baffle 302. Baffle 302 may be disposed between ribs 170 in radial passage 172 (from FIG. 3A). FIG. 5 shows a cross section of a first cooling structure 320, similar to first cooling structure 120 (from FIG. 3A). Baffle 302 may define one or more radial passages 304, including an inner radial passage 306 defined within baffle 302 and including one or more outer radial passages 308 defined between baffle 302 and walls 160, 162. Outer radial passages 308 are defined between baffle 302 and inner surface 164 of pressure side wall 160 and between baffle 302 and inner surface 166 of suction side wall 162. The flowpath of outer radial passages 308 may be narrowed by the presence of baffle 302, thereby increasing the heat transfer between cooling airflow 140 and walls 160, 162, which comprise external walls of airfoil 100.

In various embodiments, airfoil 300 may further include apertures 310 defined in a pressure side wall 160 and a suction side wall 162. Cooling airflow 140 in outer radial passages 308 may be exhausted to core flowpath C (see FIG. 2) through apertures 310 in pressure side wall 160 and suction side wall 162. Cooling airflow 140 may also be directed through inner radial passage 306 within baffle 302. The walls of baffle 302 and the cooling airflow 140 in outer radial passages 308 may shield the cooling airflow 140 within inner radial passage 306 from the heat of core flowpath C conducted by walls 160, 162 of airfoil 300. Thus, cooling airflow 140 may be directed through first cooling structure 320 while maintaining a portion of cooling airflow 140 at a lower temperature than the portion of cooling airflow 140 within outer radial passages 308. By controlling the temperature of cooling airflow 140, the airfoil 300 is configured to be more uniformly cooled.

Figure 6:
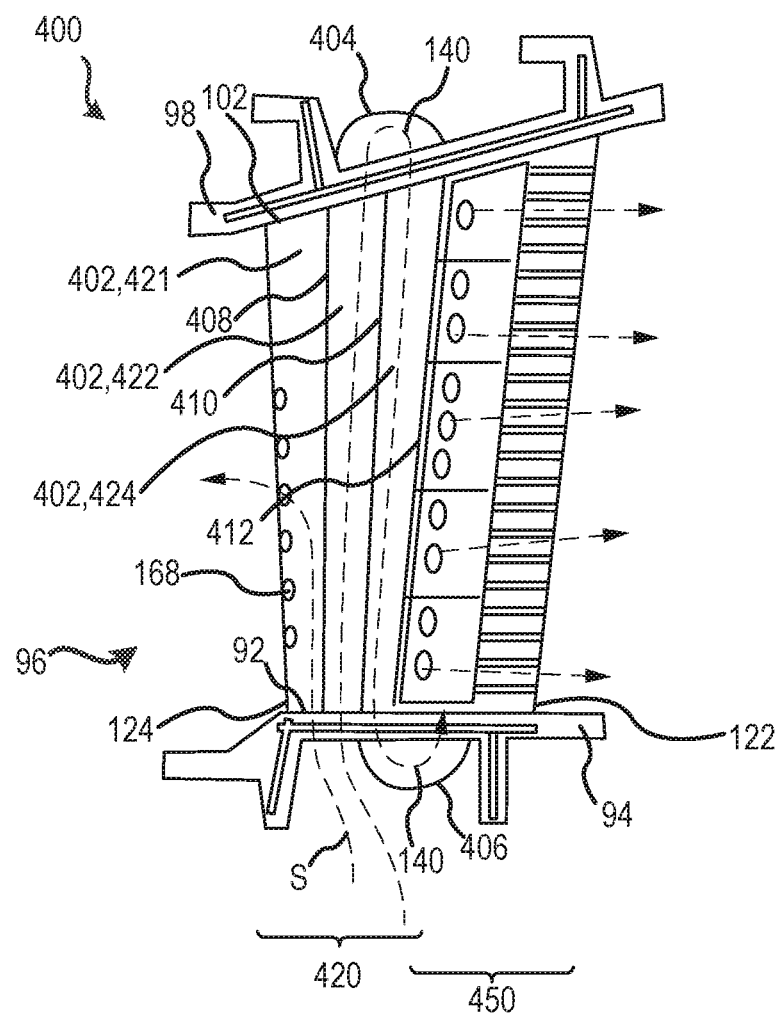
FIG. 6 illustrates a schematic view of an airfoil including an internal cooling system, in accordance with various embodiments.

With reference to FIG. 6, a schematic view of an airfoil 400 is shown, in accordance with various embodiments. In various embodiments, airfoil 400 may have features similar to airfoil 100 from FIG. 3A, and may comprise radial passages 402 having turns 404, 406 for controlling the direction of cooling airflow 140. FIG. 6 shows an airfoil 400 including a first cooling structure 420 and a second cooling structure 450, similar to cooling structures 120, 150 from FIG. 3A. In various embodiments, first cooling structure 420 may receive cooling airflow 140 from a secondary airflow path S at inner diameter end wall 92 of airfoil body 96. In various embodiments, first cooling structure 420 may receive the cooling airflow from the outer diameter of the vane. First cooling structure 420 may comprise ribs 408, 410, 412 defining radial passages 421, 422, 424 having a serpentine geometry. Cooling airflow 140 may be conducted from the inner diameter end wall 92 of airfoil body 96 radially outward through a first radial passage 421 and a second radial passage 422. A portion of cooling airflow 140 in first radial passage 421 may be discharged through a plurality of apertures 168 at leading edge 124 of airfoil 100. Another portion of cooling airflow 140 may be directed through second radial passage 422, and to a first turn 404, which redirects the cooling airflow 140 radially inward into third radial passage 424. In that regard, first turn 404 may comprise a 180-degree turn. Cooling airflow 140 is directed through third radial passage 424, for example, from outer diameter end wall 102 to inner diameter end wall 92, and to a second turn 406, which redirects the cooling airflow 140 radially outward and into second cooling structure 450. Second turn 406 may also comprise a 180-degree turn. The serpentine structure of first cooling structure 420 may increase the Mach number and heat transfer coefficient in the cooling structure.

Figure 7A:
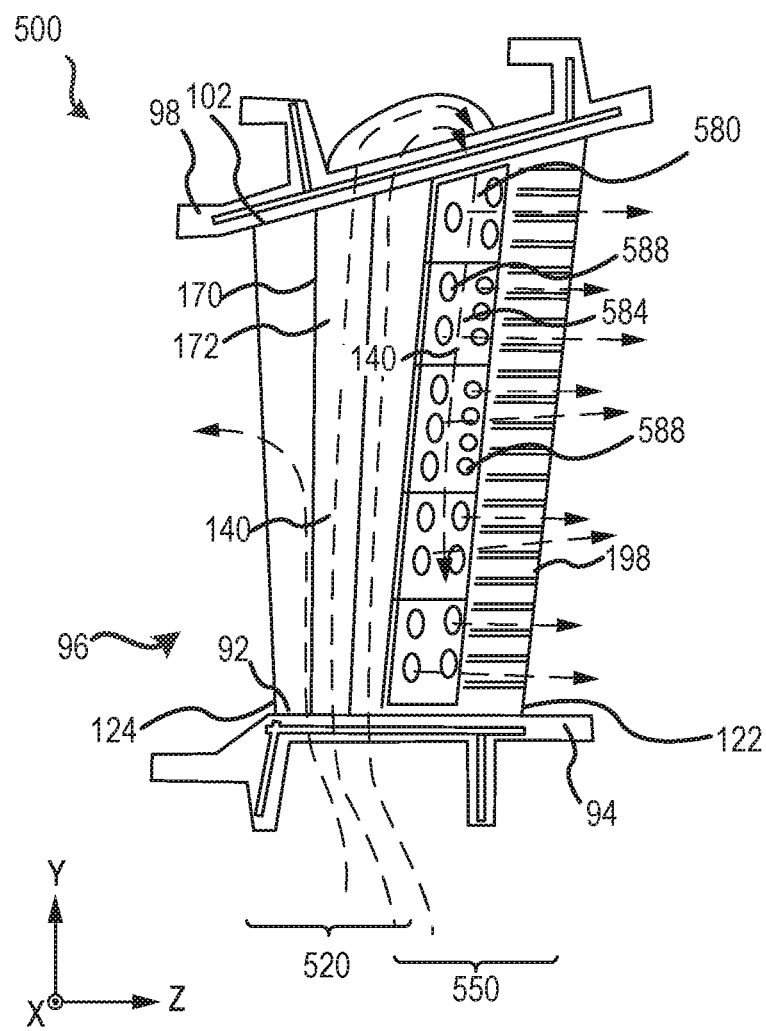
FIGS. 7A and 7B illustrate views of an airfoil including an internal cooling system, in accordance with various embodiments.
Figure 7B:
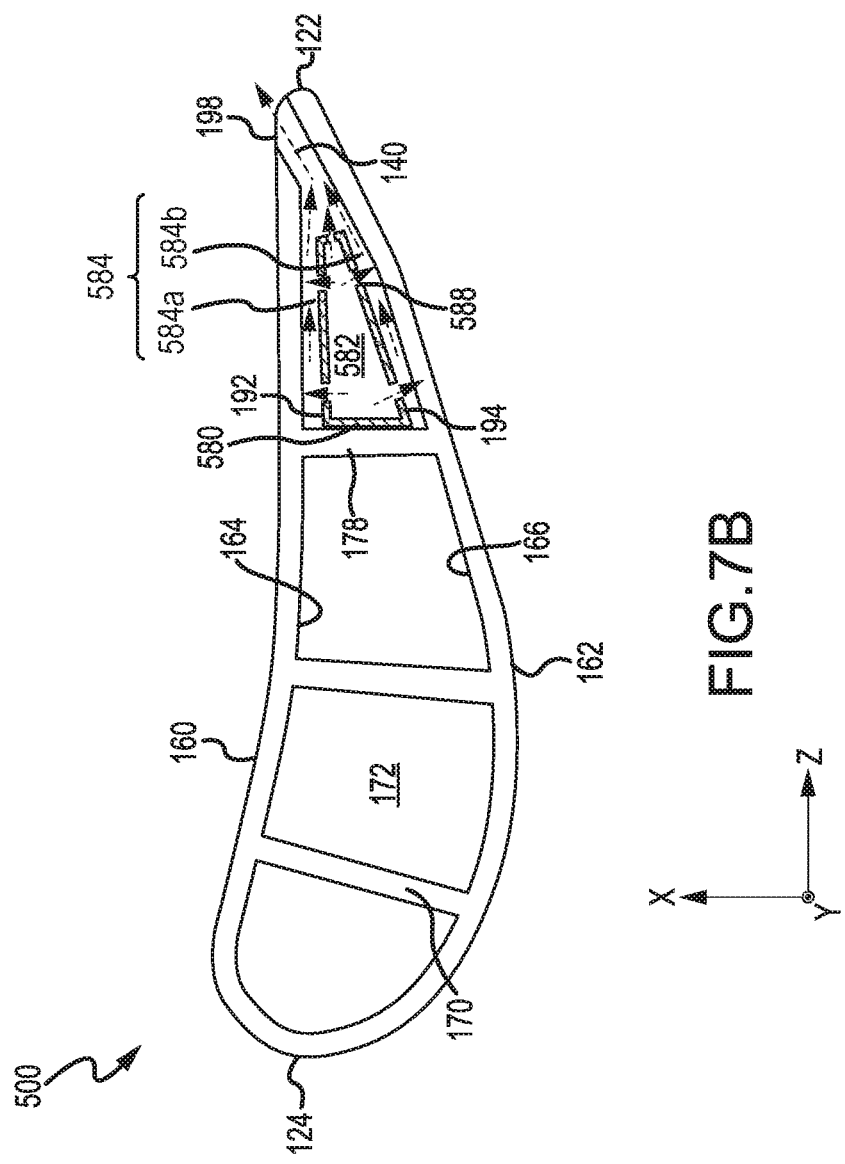

With reference to FIGS. 7A and 7B, a schematic view of an airfoil 500 is shown, in accordance with various embodiments. In various embodiments, airfoil 500 may have features similar to airfoil 100 from FIGS. 3A and 3C, and may comprise a baffle 580. FIGS. 7A and 7B show an airfoil 500 including a first cooling structure 520 and a second cooling structure 550, similar to cooling structures 120, 150 from FIG. 3A. Second cooling structure 550 may be aft of first cooling structure 520 within airfoil 500. Second cooling structure 550 may comprise one or more baffles 580 which may define one or more radial passages 582 and one or more axial passages 584 within airfoil body 96. Baffle 580 may be offset from pressure side wall 160 and suction side wall 162, to define a pressure side axial passages 584a and a suction side axial passages 584b.

Baffle 580 may define a radial passage 582 within baffle 580 and may further define a plurality of openings 588. Upon receiving cooling airflow 140 from first cooling structure 520, cooling airflow 140 may be directed through radial passage 582 within baffle 580 in a radial direction (see FIG. 7A). Cooling airflow 140 may exit the radial passage 582 of baffle 580 through one or more openings 588. Baffle 580 may have any number of openings 588. Openings 588 may be cylindrical, circular, oval, teardrop, rectangular, slots, ellipses, irregular, or other shape. Openings 588 may be radially and/or axially oriented. The shape and orientation of openings 588 may be configured to optimize the fill characteristics of cooling airflow 140 as the cooling airflow 140 is expelled from baffle 580 and travels in predominately the axial direction (z-direction) adjacent to an inner surface 164 of pressure side wall 160 and to an inner surface 166 of suction side wall 162 toward trailing edge 122 of airfoil 100. Cooling airflow 140 may exit the radial passages 582 of baffle 580 through the plurality of openings 588. Cooling airflow 140 may impinge the inner surfaces 164, 166 of airfoil body 96 and travel axially aft through axial passages 584 toward trailing edge 122. More specifically, cooling airflow 140 may travel axially aft between baffle 580 and pressure side wall 160 through pressure side axial passage 584a, and cooling airflow 140 may travel axially aft between baffle 580 and suction side wall 162 through suction side axial passage 584b. Cooling airflow 140 may exit airfoil body 96 though the plurality of apertures 198, which may be formed in the trailing edge 122 of airfoil 500.

Figure 8:
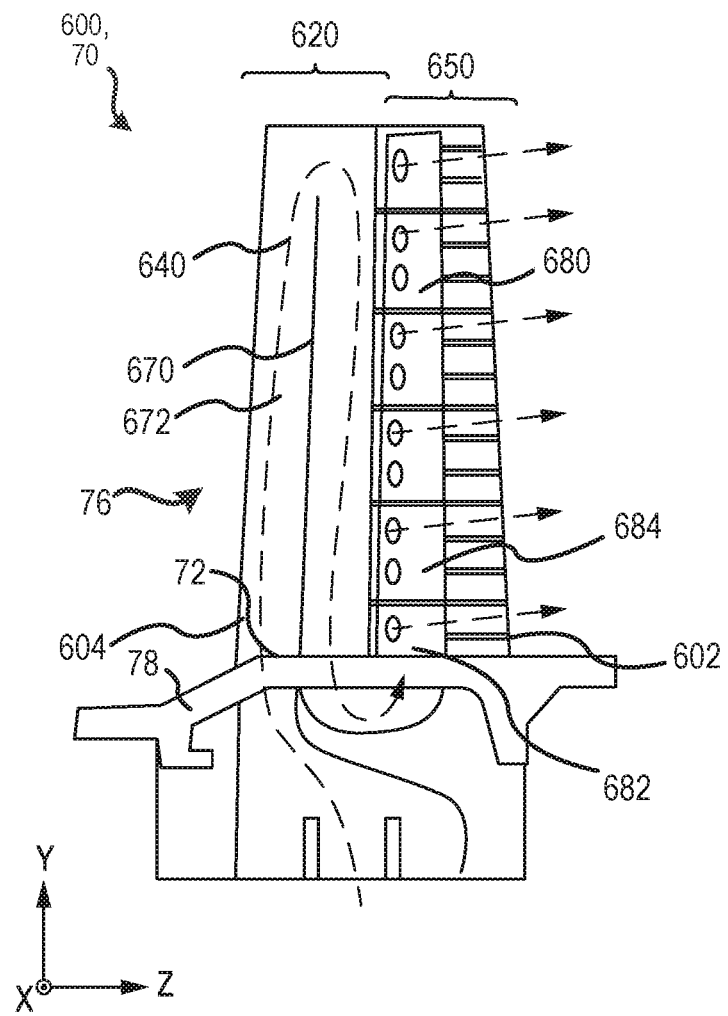
FIG. 8 illustrates a schematic view of a blade airfoil including an internal cooling system, in accordance with various embodiments.

With reference to FIG. 8, a schematic view an airfoil 600 having a first cooling structure 620 and second cooling structure 650, is shown according to various embodiments. The airfoil 600 may be a blade 70 comprising a trailing edge 602 facing an aft direction in a gas turbine engine and leading edge 604 facing a forward direction in the gas turbine engine. Leading edge 604 and trailing edge 602 may be configured and oriented to direct airflow through engine section 68 (FIG. 2). In various embodiments, blade 70 may comprise a first cooling structure 620 and a second cooling structure 650 configured to remove heat from airfoil body 76. First cooling structure 620 may comprise one or more ribs 670, which may define one or more radial passages 672 within airfoil body 76. Second cooling structure 650 may comprise one or more baffles 680 which may define one or more radial passages 682 through airfoil body 76. Second cooling structure 650 may further comprise one or more axial passages 684 within airfoil body 76. Radial passages 682 and axial passages 684 provide control over the flow and temperature of cooling airflow 640. By controlling the temperature of cooling airflow 640 via controlling the cross-sectional area of the passage, the airfoil 600 is configured to be more uniformly cooled.

The combination and utilization of various internal baffles designs enable increased thermal cooling effectiveness for low flow cooling design configurations. In order to mitigate cooling airflow heat pickup and optimize internal convective heat transfer, radial baffles enable cooling airflow to be passed through and/or around the space-eater baffles. Additionally, the utilization of a baffle in the trailing edge cavity to further mitigate cooling air heat pick up by discharging the cooling flow through various radially distributed apertures enables the cooling design to maintain higher feed pressures within the trailing edge baffle before being discharged through the apertures which then conduct the cooling airflow axially toward the trailing edge of the airfoil. The ability to tailor the pressure and suction side axial flow heat transfer and pressure loss as well as the radial distribution of flow through the apertures ensures that positive back flow margin and convective cooling designs can be optimized to mitigate non-uniform external heat flux distributions along the airfoil and inner diameter and outer diameter end wall surfaces.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An airfoil for use in a gas turbine engine, the airfoil comprising:
    an airfoil body having a leading edge, a trailing edge, a pressure side wall, a suction side wall, an inner diameter end wall and an outer diameter end wall;
    a first cooling structure disposed within the airfoil body, the first cooling structure comprising:
        a first radial passage defined at least partially by a first rib extending between the inner diameter end wall and the outer diameter end wall and between the pressure side wall and the suction side wall, and
        a second radial passaged defined at least partially by the first rib and a second rib extending between the inner diameter end wall and the outer diameter end wall and between the pressure side wall and the suction side wall, wherein at least one of the a first radial passage or the second radial passage is configured to conduct a cooling airflow in a first radial direction through the airfoil body; and
    a second cooling structure disposed within the airfoil body, the second cooling structure comprising:
        a first baffle defining a third radial passage configured to conduct the cooling airflow in a second radial direction opposite the first radial direction, wherein the first baffle is located between the second rib and the trailing edge of the airfoil body;
        a plurality of first axial standoffs contacting a first wall of the first baffle and an inner surface of the pressure side wall of the airfoil body, wherein the plurality of first axial standoffs define a plurality of first axial passages between the first wall of the first baffle and the pressure side wall of the airfoil body, and a plurality of second axial standoffs contacting a second wall of the first baffle and an inner surface of the suction side wall of the airfoil body, wherein the plurality of second axial standoffs define a plurality of second axial passages between the second wall of the first baffle and the suction side wall of the airfoil body, wherein the plurality of first axial passages and the plurality of second axial passages conduct the cooling airflow in an axial direction toward the trailing edge of the airfoil body.

2. The airfoil of claim 1, further comprises a 180-degree turn configured to direct the cooling airflow from the first cooling structure into the second cooling structure.

3. The airfoil of claim 1, further comprising:
a first 180-degree turn configured to direct the cooling airflow from the first radial passage into the second radial passage; and
a second 180-degree turn configured to direct the cooling airflow from the second radial passage into the first baffle.

4. The airfoil of claim 1, further comprising a plurality of apertures formed in the trailing edge of the airfoil body, the plurality of apertures configured to conduct the cooling airflow exiting the airfoil body.

5. The airfoil of claim 1, wherein the first baffle defines a plurality of first openings to direct the cooling airflow from within the first baffle and toward at least one of the suction side wall or the pressure side wall of the airfoil body.

6. The airfoil of claim 5, wherein the first baffle further defines a plurality of second openings in a trailing edge of the first baffle to direct the cooling airflow from within the first baffle toward the trailing edge of the airfoil body.

7. The airfoil of claim 1, wherein the first cooling structure further comprises a second baffle disposed in the first radial passage, the second baffle occupying a portion of first radial passage to reduce a cross sectional channel area of the cooling airflow through the first radial passage.

8. The airfoil of claim 7, wherein the second baffle defines an inner radial passage within the second baffle, and wherein an outer radial passage is defined between the second baffle and at least one of the pressure side wall or the suction side wall, and wherein the second baffle is configured to isolate the cooling airflow in the outer radial passage from the cooling airflow in the inner radial passage.

9. A turbine section of a gas turbine engine, the turbine section comprising:
a blade coupled to a disk configured to rotate about an axis;
a vane configured to be stationary with respect to the axis;
at least one of the blade or the vane having an airfoil body, the airfoil body having a leading edge, a trailing edge, a pressure side wall, a suction side wall, an inner diameter end wall and an outer diameter end wall;
a first cooling structure disposed within the airfoil body, the first cooling structure comprising:
a first radial passage defined at least partially by a first rib extending between the pressure side wall and the suction side wall, and
a second radial passage defined at least partially by the first rib and a second rib extending between the pressure side wall and the suction side wall, wherein at least one of the first radial passage or the second radial passage is configured to conduct a cooling airflow in a first radial direction through the airfoil body;

a second cooling structure disposed within the airfoil body, the second cooling structure comprising a first baffle located between the second rib and the trailing edge of the airfoil body, the second cooling structure defining an axial passage configured to conduct the cooling airflow in an axial direction toward the trailing edge of the airfoil body; and
a 180-degree turn fluidly coupling the first cooling structure and the second cooling structure.

10. The turbine section of claim 9, further comprising a plurality of apertures formed in the trailing edge of the airfoil body, the plurality of apertures configured to conduct the cooling airflow exiting the airfoil body.

11. The turbine section of claim 9, wherein the first baffle defines a plurality of first openings to direct the cooling airflow from within the first baffle and toward at least one of the suction side wall or the pressure side wall of the airfoil body.

12. The turbine section of claim 11, wherein the first baffle further defines a plurality of second openings in a trailing edge of the first baffle to direct the cooling airflow from within the first baffle toward the trailing edge of the airfoil body.

13. The turbine section of claim 9, wherein the first cooling structure further comprises a second baffle disposed in the first radial passage, the second baffle occupying a portion of the first radial passage to reduce a cross sectional channel area of the cooling airflow through the first radial passage.

14. The turbine section of claim 13, wherein the second baffle defines an inner radial passage, and wherein an outer radial passage is define between the second baffle and at least one of the pressure side wall or the suction side wall, and wherein the second baffle is configured to thermally isolate the outer radial passage from the inner radial passage.

15. A gas turbine engine, comprising:
a turbine section having a core flowpath and a cooling airflow;
an airfoil having an airfoil body disposed in the core flowpath;
a first cooling structure disposed within the airfoil body, the first cooling structure comprising:
a first radial passage defined at least partially by a first rib;
a second radial passage defined at least partially by the first rib and a second rib, wherein at least one of the first radial passage or the second radial passage is configured to direct the cooling airflow through the airfoil body in a first radial direction; and
a second cooling structure disposed within the airfoil body, the second cooling structure comprising a first baffle located aft of the second rib and configured to direct the cooling airflow in a second radial direction opposite the first radial direction, the second cooling structure further defining an axial passage configured to direct the cooling airflow in an axial direction through an aft portion of the airfoil body.

16. The gas turbine engine of claim 15, wherein the first cooling structure further comprises a second baffle disposed in the first radial passage, the second baffle occupying a portion of the first radial passage to reduce a cross sectional channel area of the cooling airflow through the first radial passage.

17. The gas turbine engine of claim 15, further comprising a turn configured to direct the cooling airflow from the first cooling structure into the second cooling structure.

18. The gas turbine engine of claim 15, wherein the first baffle defines a plurality of openings to direct the cooling airflow from within the first baffle and toward at least one of a suction side wall or a pressure side wall of the airfoil body.

19. The gas turbine engine of claim 18, further comprising a plurality of apertures formed in a trailing edge of the first baffle, the plurality of apertures configured to conduct the cooling airflow from the axial passage toward the trailing edge of the airfoil body.

* * * * *

UNITED STATES PATENT AND TRADEMARK OFFICE
CERTIFICATE OF CORRECTION

PATENT NO. : 10,669,861 B2  
APPLICATION NO. : 15/433130  
DATED : June 2, 2020  
INVENTOR(S) : Brandon Spangler et al.

Page 1 of 1

It is certified that error appears in the above-identified patent and that said Letters Patent is hereby corrected as shown below:

In the Claims

In Claim 14, Column 16, Line 33, please delete "define" and insert --defined--

Signed and Sealed this
Second Day of March, 2021

Drew Hirshfeld
*Performing the Functions and Duties of the
Under Secretary of Commerce for Intellectual Property and
Director of the United States Patent and Trademark Office*